(12) United States Patent
Hwang et al.

(10) Patent No.: US 12,495,108 B2
(45) Date of Patent: Dec. 9, 2025

(54) ELECTRONIC DEVICE AND METHOD FOR PROVIDING USER INTERFACE DURING CALL

(71) Applicant: Samsung Electronics Co., Ltd., Suwon-si (KR)

(72) Inventors: Jinho Hwang, Suwon-si (KR); Soeun Bae, Suwon-si (KR); Kyuhoon Myung, Suwon-si (KR); Younggyun Park, Suwon-si (KR); Seungrak Baek, Suwon-si (KR); Jinju Lee, Suwon-si (KR); Hyunsik Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 375 days.

(21) Appl. No.: 18/181,776

(22) Filed: Mar. 10, 2023

(65) Prior Publication Data

US 2023/0224397 A1 Jul. 13, 2023

Related U.S. Application Data

(63) Continuation of application No. PCT/KR2021/014094, filed on Oct. 13, 2021.

(30) Foreign Application Priority Data

Oct. 23, 2020 (KR) ........................ 10-2020-0138620

(51) Int. Cl.
*H04M 1/72469* (2021.01)
*H04M 1/72409* (2021.01)

(52) U.S. Cl.
CPC ... *H04M 1/72409* (2021.01); *H04M 1/72469* (2021.01)

(58) Field of Classification Search
CPC ............ H04M 1/6041; H04M 1/6066; H04M 2201/38; H04M 2250/02; H04M 1/72412;
(Continued)

(56) References Cited

U.S. PATENT DOCUMENTS 8,611,819 B2 12/2013 Lee et al.
2008/0242220 A1 10/2008 Wilson et al.
(Continued)

FOREIGN PATENT DOCUMENTS

KR 10-2008-0045525 A 5/2008
KR 10-2009-0012477 A 2/2009
(Continued)

OTHER PUBLICATIONS

International Search Report dated Jan. 20, 2022, issued in International Patent Application No. PCT/KR2021/014094.
(Continued)

*Primary Examiner* — Angelica Perez
(74) *Attorney, Agent, or Firm* — Jefferson IP Law, LLP

(57) ABSTRACT

An electronic device is provided. The electronic device includes a display, a communication interface, and at least one processor operatively connected to the display and the communication interface, wherein the processor is configured to when a call is connected to a counterpart electronic device, display a call user interface (UI) including a plurality of graphic objects enabling selection of a function available during a call, in relation to a function of a first graphic object of the call UI, identify at least one external device which can be connected through the communication interface, determine the priority of the identified at least one connectable external device, and display the first graphic object including a first sub-object indicating the function of the first graphic object and a second sub-object indicating a first
(Continued)

external device having the highest priority among the identified at least one connectable external device.

19 Claims, 13 Drawing Sheets

(58) Field of Classification Search
CPC ......... H04M 2201/34; H04M 1/72409; H04M 1/72469
See application file for complete search history.

(56) References Cited

U.S. PATENT DOCUMENTS

| | | | |
|---|---|---|---|
| 2010/0285785 | A1 | 11/2010 | Wang et al. |
| 2011/0275391 | A1* | 11/2011 | Lee ................ H04W 16/20 455/500 |
| 2014/0045430 | A1* | 2/2014 | Kim ................ H04M 1/72412 455/566 |
| 2015/0106175 | A1 | 4/2015 | Kang et al. |
| 2015/0253885 | A1 | 9/2015 | Kagan et al. |
| 2015/0350448 | A1* | 12/2015 | Coffman ........... H04M 3/42263 379/212.01 |
| 2017/0237986 | A1* | 8/2017 | Choi ................ H04W 4/80 348/14.02 |
| 2018/0101199 | A1* | 4/2018 | Myung ............. G06F 1/1692 |
| 2019/0124203 | A1 | 4/2019 | Coffman et al. |
| 2019/0141186 | A1 | 5/2019 | Couse et al. |
| 2019/0286297 | A1 | 9/2019 | Wilson et al. |
| 2020/0014984 | A1 | 1/2020 | Lee et al. |
| 2020/0053195 | A1* | 2/2020 | Park ................. H04W 68/04 |
| 2020/0167060 | A1* | 5/2020 | Sun ................. G06F 3/04847 |

FOREIGN PATENT DOCUMENTS

| | | | |
|---|---|---|---|
| KR | 20090012477 | * | 2/2009 |
| KR | 10-2009-0132636 A | | 12/2009 |
| KR | 10-2011-0062090 A | | 6/2011 |
| KR | 10-2011-0123348 A | | 11/2011 |
| KR | 10-2014-0022190 A | | 2/2014 |
| KR | 20150051539 | * | 5/2015 |
| KR | 10-2149779 B1 | | 8/2020 |
| WO | WO-2021131525 A1 | * | 7/2021 |

OTHER PUBLICATIONS

Korean Office Action dated Dec. 3, 2024, issued in a Korean Patent Application No. 10-2020-0138620.
Korean Notice of Allowance dated Feb. 6, 2025, issued in a Korean Patent Application No. 10-2020-0138620.

* cited by examiner

ELECTRONIC DEVICE AND METHOD FOR PROVIDING USER INTERFACE DURING CALL

CROSS-REFERENCE TO RELATED APPLICATION(S)

This application is a continuation application, claiming priority under § 365(c), of an International application No. PCT/KR2021/014094, filed on Oct. 13, 2021, which is based on and claims the benefit of a Korean patent application number 10-2020-0138620, filed on Oct. 23, 2020, in the Korean Intellectual Property Office, the disclosure of which is incorporated by reference herein in its entirety.

BACKGROUND

1. Field

The disclosure relates to an electronic device. More particularly, the disclosure relates to an electronic device capable of providing various user interfaces (UIs) during a call connection with a counterpart electronic device.

2. Description of Related Art

Portable devices (hereinafter, electronic devices) that provide a call function over a cellular network have been equipped with various functions according to the development of mobile communication technology and hardware/processor technology. For example, an electronic device implements a user interface by means of a touch screen technology, and provide various functions related to a voice call or video call.

An electronic device may use wireless earphones connected via short-range wireless communication rather than wired earphones according to support of a short-range wireless communication technology. In addition, an electronic device may also provide a function, during a call, using a resource, such as a camera of a different device, or switching a call service to a different device.

The above information is presented as background information only to assist with an understanding of the disclosure. No determination has been made, and no assertion is made, as to whether any of the above might be applicable as prior art with regard to the disclosure.

SUMMARY

When a call service is provided via an electronic device, a user interface allowing a user to select several functions available during a call may be provided. A conventional user interface provided during a call service in an electronic device merely allows simple execution of a function, and is thus not intuitive and requires several manipulations from a user.

Aspects of the disclosure are to address at least the above-mentioned problems and/or disadvantages and to provide at least the advantages described below. Accordingly, an aspect of the disclosure is to provide an available function in a user interface provided in an electronic device during a call, and information of an external device related to the function, so as to improve user experience.

Additional aspects will be set forth in part in the description which follows and, in part, will be apparent from the description, or may be learned by practice of the presented embodiments.

In accordance with an aspect of the disclosure, an electronic device is provided. The electronic device includes a display, a communication module, and a processor operatively connected to the display and the communication module, wherein the processor is configured to, in case that a call is connected to a counterpart electronic device, display a call user interface (UI) including multiple graphic objects allowing selection of a function available during a call, identify at least one external device connectable via the communication module in relation to a function of a first graphic object of the call UI, determine a priority of the identified at least one connectable external device, and display the first graphic object including a first sub-object indicating the function of the first graphic object and a second sub-object indicating a first external device having a highest priority among the identified at least one connectable external device.

In accordance with another aspect of the disclosure, a user interface providing method of an electronic device is provided. The user interface includes, in case that a call is connected to a counterpart electronic device, identifying at least one external device connectable to the electronic device in relation to a function of a first graphic object of a call UI, determining a priority of the identified at least one connectable external device, and displaying the call UI including multiple graphic objects allowing selection of a function available during a call, wherein the first graphic object of the call UI includes a first sub-object indicating the function of the first graphic object and a second sub-object indicating a first external device having a highest priority among the identified at least one connectable external device.

Various embodiments of this document may provide an electronic device which intuitively presents an available function in a user interface provided during a call, and information of an external device related to the function, so as to improve user experience, and a user interface providing method of an electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
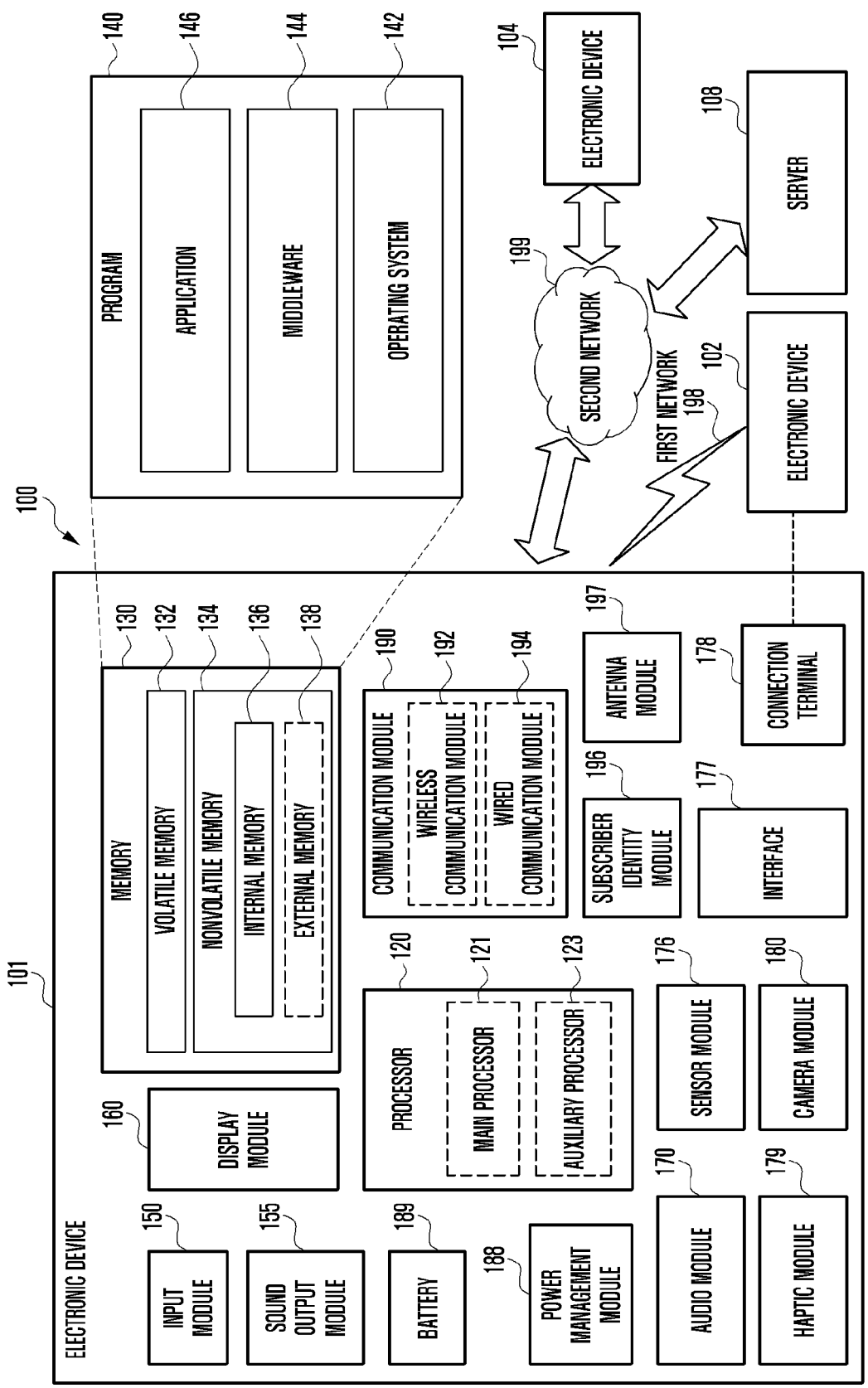
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence (AI) model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in another aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
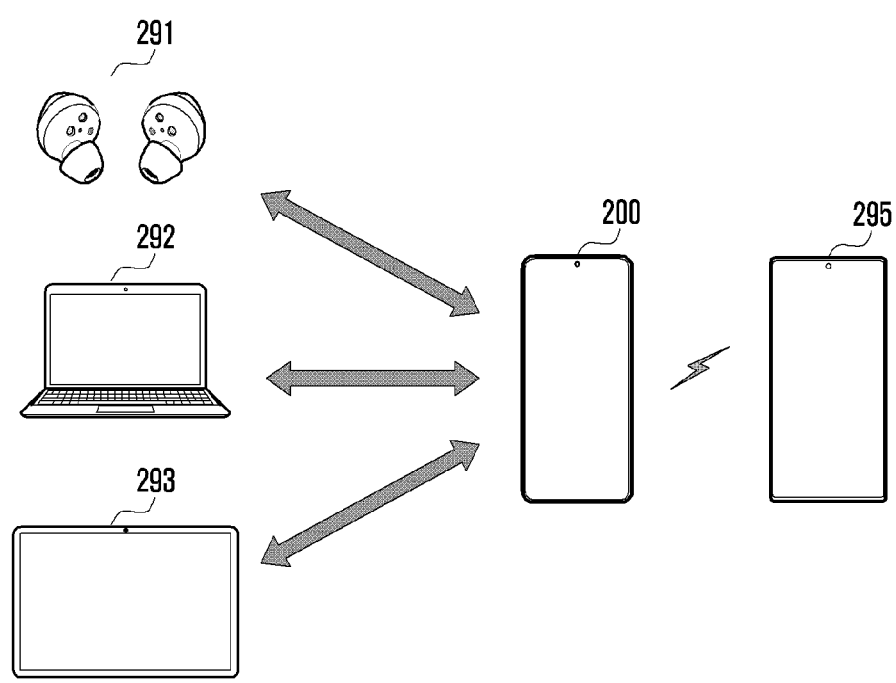
FIG. 2 illustrates an electronic device and an external device according to an embodiment of the disclosure.

FIG. 2 illustrates an electronic device and an external device according to an embodiment of the disclosure.

Hereinafter, a device that is connected to a different device in a call connection state, then provides several functions, and provides a user interface related to the functions will be called an electronic device 200 (e.g., the electronic device 101 in FIG. 1), a device that performs a call with the electronic device 200 over a cellular network (e.g., the second network 199 in FIG. 1) will be called a counterpart electronic device 295 (e.g., the electronic device 104 in FIG. 1), and a device that, during a call connection of the electronic device 200 with the counterpart electronic device 295, is connected to the electronic device 200 through communication over a short-range network (e.g., the first network 198 in FIG. 1) and then transmits or receives several data in relation to a call service will be called an external device (e.g., a first external device 291, a second external device 292, and a third external device 293) (e.g., the electronic device 102 in FIG. 1). The same device may operate as the electronic device 200 or the counterpart electronic device 295 according to a call transmission/reception situation, and the electronic device 200 and the counterpart electronic device 295 may be implemented as the same type of devices (e.g., a smartphone, a tablet personal computer (PC), and a laptop PC).

According to various embodiments, the electronic device 200 may perform a voice call service with the counterpart electronic device 295 by using cellular communication. A voice call between the electronic device 200 and the counterpart electronic device 295 may use an Internet protocol (IP)-based IP multimedia system (IMS) network (e.g., long-term evolution (LTE) voice communication service (voice over long-term evolution (VoLTE)) or 5G voice communication (voice over new radio (VoNR)), or use a circuit switching network.

According to various embodiments, the electronic device 200 may be connected to the external devices 291, 292, and 293 by using short-range communication (e.g., Wi-Fi or Bluetooth), and may be connected to or disconnected from the external devices 291, 292, and 293 during a call. For example, the electronic device 200 is connected to, via short-range communication, the first external device 291 (e.g., earbuds, Bluetooth earphones, or an AI speaker) supporting a transmitted/received voice of a call, the second external device 292 (e.g., a laptop PC) connected through a desktop experience (Dex) service, and the third external device 293 (e.g., a tablet PC) connected through a call and message continuity (CMC) service.

According to various embodiments, the electronic device 200 may include a call user interface (UI) including multiple graphic objects allowing selection of a function available during a call on a display during a call. For example, the call UI includes at least one graphic object allowing selection of a function, such as call recording, video call (or voice call) switching, Bluetooth connection, speaker mode, transmitted voice mute, keypad displaying, and call ending.

According to an increase of functions available during a call, the call UI may be required to include multiple graphic objects. Accordingly, when the electronic device 200 attempts to connect to the external devices 291, 292, and 293 (e.g., earbuds, Bluetooth earphones, or an AI speaker) through a designated function (e.g., Bluetooth), a several-depth user interface may be provided, and in some cases, there may be an inconvenient process of needing to attempt to connect to a different external device again after connection to a designated external device.

Hereinafter, with reference to FIGS. 3 to 5, 6A, 6B, 7 to 9, 10A, 10B, and 11, various embodiments for implementing a call UI allowing a user to more intuitively recognize an external device to be connected and to easily select a desired function will be described.

Figure 3:
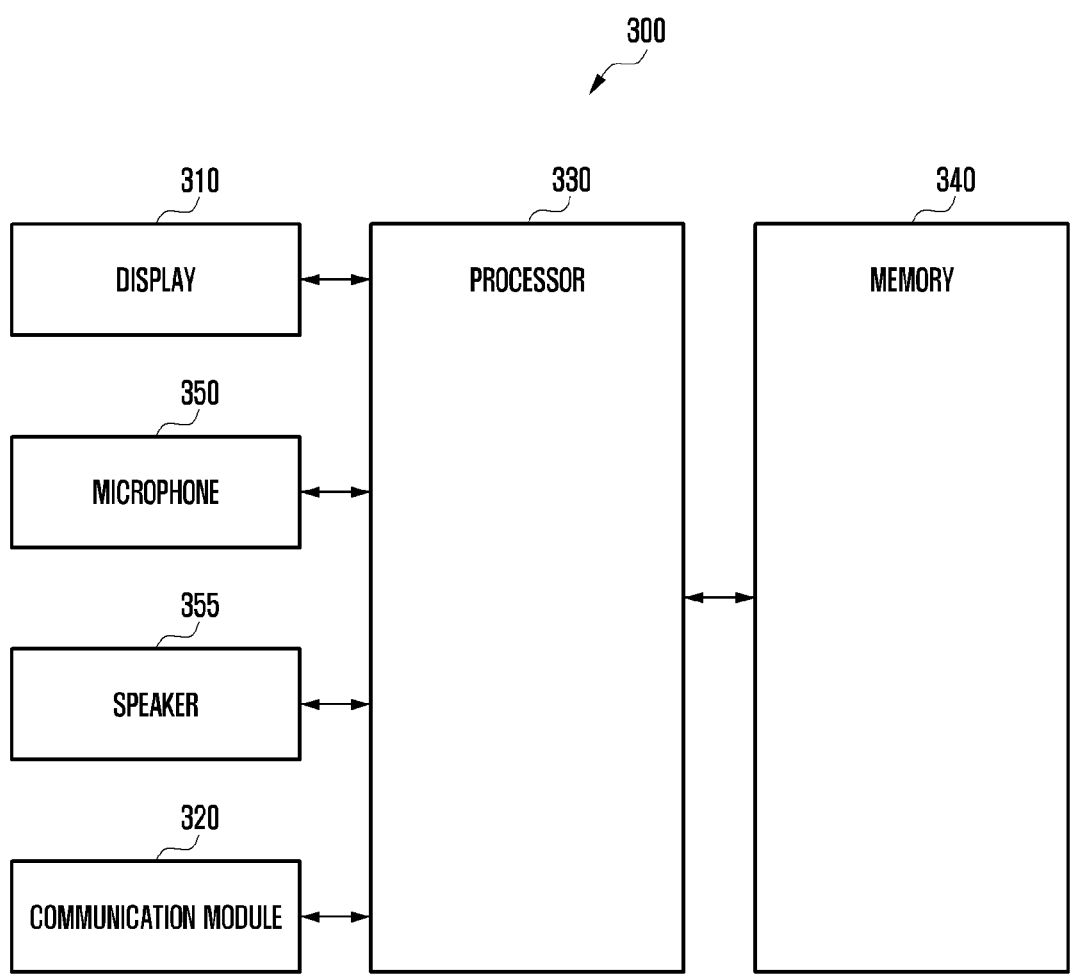
FIG. 3 is a block diagram of an electronic device according to an embodiment of the disclosure.

FIG. 3 is a block diagram of an electronic device according to an embodiment of the disclosure.

Referring to FIG. 3, an electronic device 300 may include a display 310, a microphone 350, a speaker 355, a communication module 320, a processor 330, and a memory 340, and in various embodiments, some of the illustrated elements may be omitted or replaced. The electronic device 300 may further include at least some of elements and/or functions of the electronic device 101 in FIG. 1. At least some of the illustrated (not illustrated) elements of the electronic device 300 may be operatively, functionally, and/or electrically connected to each other.

According to various embodiments, the display 310 may be implemented as one of a liquid crystal display (LCD), a light-emitting diode (LED) display, and an organic light-emitting diode (OLED) display, and is not limited thereto. The display 310 may be configured by a touch screen that detects an input of at least one of a touch or a proximity touch (or hovering) made by using a part (e.g., a finger) of a user's body or an input device (e.g., a stylus pen). The display 310 may include at least some of elements and/or functions of the display module 160 in FIG. 1.

According to various embodiments, the display 310 may display various images according to a control of the processor 330. For example, the display 310 displays a call UI during a call with a counterpart electronic device (e.g., the counterpart electronic device 295 in FIG. 2).

According to various embodiments, the display 310 may be at least partially flexible, and may be implemented as a foldable display or a rollable display.

According to various embodiments, the microphone 350 may collect external sounds such as a user's speech, and convert the collected external sounds into a voice signal that is digital data.

According to various embodiments, the speaker 355 may output various sounds provided from the processor 330. In a case where the electronic device 300 is switched to a phone mode for the speaker 355 while executing a call function, a counterpart voice signal received from the counterpart electronic device 295 may be output through the speaker 355.

According to various embodiments, the communication module 320 may communicate with an external device over a wireless network according to a control of the processor 330. The communication module 320 may include hardware and software modules for transmitting or receiving data to or from a cellular network (e.g., a LTE network or a 5G network) and a short-range network (e.g., Wi-Fi or Bluetooth). The communication module 320 may include at least some of elements and/or functions of the communication module 190 in FIG. 1.

According to various embodiments, the memory 340 may include a volatile memory (e.g., the volatile memory 132 in FIG. 1) and a non-volatile memory (e.g., the non-volatile memory 134 in FIG. 1) so as to temporarily or permanently store various data. The memory 340 may include at least some of elements and/or functions of the memory 130 in FIG. 1, and store the program 140 in FIG. 1.

According to various embodiments, the memory 340 may store various instructions executable in the processor 330. Such instructions may include control commands such as arithmetic and logical operations, data transfer, or input/output which are recognizable by the processor 330.

According to various embodiments, the processor 330 may be an element capable of performing calculation or data processing related to control and/or communication of each element of the electronic device 300, and may be configured by one or more processors. The processor 330 may include at least some of elements and/or functions of the processor 120 in FIG. 1.

According to various embodiments, there may be no limit to calculation and data processing functions which the processor 330 is able to implement on the electronic device 300. However, hereinafter, various embodiments for, during execution of a call function, recognizing an external device and determining the priority thereof, generating and displaying a call UI, and connecting to the external device according to a user input on the call UI will be described. Operations of the processor 330 described later may be performed by loading instructions stored in the memory 340.

According to various embodiments, the processor 330 may perform a call connection with a counterpart electronic device (e.g., the counterpart electronic device 295 in FIG. 2) via the communication module 320. The call connection may include a connection of a voice call or a video call via an Internet protocol (IP)-based IP multimedia system (IMS) network (e.g., LTE voice communication service (VoLTE) or 5G voice communication (VoNR)), or a circuit switching network.

According to various embodiments, in a case where a call is connected to a counterpart electronic device, the processor 330 may generate a call UI via a call application and display same on the display 310. The call UI may indicate a user interface including multiple graphic objects allowing selection of a function available during a call. For example, the call UI includes multiple graphic objects mapped to respective functions, such as call recording, video call (or voice call) switching, Bluetooth connection, speaker mode, transmitted voice mute, keypad displaying, and call ending. The call UI may be differently generated according to a function supported in a video call or a voice call.

According to various embodiments, at least some of the multiple graphic objects included in the call UI may be graphic objects allowing selection of connection with an external device or disconnection therefrom. For example, the call UI includes a Bluetooth button allowing selection of connection with one of external devices or disconnection therefrom by using Bluetooth or BLE. Bluetooth technology allows the electronic device 300 to operate as a master device and be connected to multiple slave devices, but the electronic device 300 may allow connection of only one external device as a slave device in order to prevent an overlap between transmitted/received sounds during a call.

According to various embodiments, the processor 330 may identify at least one external device connectable via a designated function during a call. For example, in a case where a call transmission or reception is periodically initiated regardless of whether a call is connected, the processor 330 temporarily activates Bluetooth to request and receive a state of an external device having been previously connected and being in a bonding state, or broadcast an inquiry request to neighboring external devices, and receive a response corresponding to the inquiry request from an external device. According to an embodiment, the processor 330 may identify state information of an external device. The state information may include information relating to whether the external device is currently activated and is able to communicate with the electronic device 300 via Bluetooth, whether the external device is a device having a profile enabling input/output of a call voice, and/or whether the external device is currently connected to a different device. For example, in a case where a signal is received from an external device via the communication module 320, the processor 330 identifies whether the external device is active, and may identify, from the received signal, whether a profile is a profile (e.g., a hands-free profile (HFP) or a headset profile (HSP)) available for a call, and/or whether the external device is currently connected to a different device. In a case of an external device having been previously connected and being in a bonding state, the processor 330 may store profile information in the memory 340 and identify same in the state identifying operation.

According to an embodiment, the processor 330 may store information of an external device having been previously connected via a designated function (e.g., Bluetooth connection), and identify whether the external device is connectable. According to an embodiment, in a case where there is no external device having been previously connected, the processor 330 may identify a connectable external device, based on the strength of a signal received from the external device.

According to various embodiments, at least some of graphic objects of a call UI may include a first sub-object indicating a function of a corresponding graphic object, and a second sub-object indicating one of at least one external device connectable via the corresponding function. The first sub-object may include an image (or icon) indicating a corresponding function. For example, a first sub-object corresponding to Bluetooth connection includes an image defined in a Bluetooth standard and/or widely used in Bluetooth technology. The second sub-object is text information indicating an external device, and for example, includes at least one of a name or ID provided from the corresponding device, or a name input by a user. The first sub-object or the second sub-object may be independently selected, and different operations may be performed according to selection of the first sub-object or the second sub-object.

According to various embodiments, the processor 330 may determine the priority of at least one external device connectable via the communication module 320. The priority may be determined based on a connection time point of each external device, a connection frequency, and/or a user's configuration. For example, the processor 330 at least one of determines a priority in an order of recent connection (e.g., paring or bonding), and/or determines a priority in an order from the largest connection counts to the smallest during a predetermined period (e.g., one week or one month), and determines a first ranking for an external device designated by a user's selection on a UI. According to an embodiment, a call application executed during a call may request the priority of at least one external device from a framework (e.g., a Bluetooth adaptor), and the framework may provide information of an external device having the highest priority to the call application.

According to various embodiments, the second sub-object may indicate an external device having the highest priority among at least one connectable external device. For example, in a case where there are multiple external devices connectable during a call through information obtained from a framework, the processor 330 (or a call application) includes, in the second sub-object, text information such as a name or ID indicating the highest priority. Alternatively, in a case where one external device connectable during a call is determined, the processor may include, in the second sub-object, text information such as a name or identifier (ID) indicating the external device. In a case where there are multiple connectable external devices, the second sub-object may include an object for indicating connectability with a different external device, and thus be distinguished from a case where there is one connectable external device. An operation of determining the priority of an external device by the electronic device 300 will be described in more detail with reference to FIG. 5.

According to various embodiments, the processor 330 may perform a function corresponding to a graphic object in response to a user input to a first sub-object of the graphic object. For example, in a case where a first sub-object (e.g., a Bluetooth image) of a Bluetooth button is selected, the processor 330 performs Bluetooth connection with an external device indicated by a second sub-object by using the communication module 320. In addition, in a case where there is one connectable external device, the processor 330 may perform the function corresponding to the graphic object in response to a user input to the second sub-object.

That is, in a case where there is one connectable external device, the same function may be performed when the first sub-object is selected or when the second sub-object is selected.

According to various embodiments, the processor 330 may display a sub-UI allowing selection of one of at least one external device in response to a user input to a second sub-object of a graphic object. For example, in a case where there are multiple connectable external devices, a second sub-object includes information indicating an external device having the highest priority, and in a case where a user selects the second sub-object, a sub-UI may be displayed so that one of connectable external devices and the external device having the highest priority is selected. For example, the sub-UI is displayed on the call UI in a pop-up type. In a case where a user selects one of designated external devices while a sub-UI is displayed, a function (e.g., Bluetooth connection) corresponding to the graphic object may be performed with the selected external device. In addition, the processor 330 may remove a sub-UI according to a user input on the sub-UI, and change the second sub-object of a corresponding graphic object of a call UI to information indicating an external device selected on the sub-UI by a user.

According to a different embodiment, in a case where one of external devices is selected on a sub-UI, the processor 330 may not immediately connect to the selected external device, and change only the second sub-object to information indicating the selected external device. Thereafter, in a case where a user selects a first sub-object in the changed graphic object, the processor may attempt to connect the corresponding external device. An operation of changing a call UI when a user input is generated to a first sub-object and a second sub-object will be described in more detail with reference to FIGS. 6A and 6B.

According to various embodiments, in a case where a function corresponding to a graphic object is executed to correspond to a user input, the processor 330 may visually change a first sub-object. For example, the processor 330 displays, in black and white, an image (or icon) of a first sub-object of a Bluetooth button before Bluetooth connection with an external device, and display same in a designated color when connection is proceeded (or completed), so as to be visually distinguished.

According to various embodiments, the processor 330 may change a first sub-object to a third sub-object indicating a type of an external device for which a connection is proceeded (or completed). For example, in a case where earbuds are connected via Bluetooth communication according to a user input, a first sub-object including a Bluetooth image is changed to a third sub-object including an earbuds image. This embodiment will be described in more detail with reference to FIG. 7.

According to various embodiments, the processor 330 may also change a second graphic object according to activation of a function of a first graphic object among multiple graphic objects of a call UI. A function assigned to the second graphic object may be a function changed in conjunction with activation of a function of the first graphic object. For example, in a case where a call voice input/output of an external device (e.g., earbuds) is configured to be used through a Bluetooth communication connection during a call, a transmitted voice mute button related to call voice input/output is also changed to indicate blockage of a transmitted voice input in the external device. This embodiment will be described in more detail with reference to FIGS. 10A and 10B.

According to various embodiments, the electronic device 300 may connect to an external device already connected to a different device. For example, in a case where earbuds are already connected to a different device, the electronic device 300 displays, on a call UI, information indicating that the earbuds have been already connected to the different device, and in a case where a user selects the earbuds, the electronic device may perform a Bluetooth communication connection with the earbuds. In this case, the earbuds may release previously established Bluetooth connection with the different device, and attempt to establish Bluetooth connection with the electronic device 300. This embodiment will be described in more detail with reference to FIG. 11.

Figure 4:
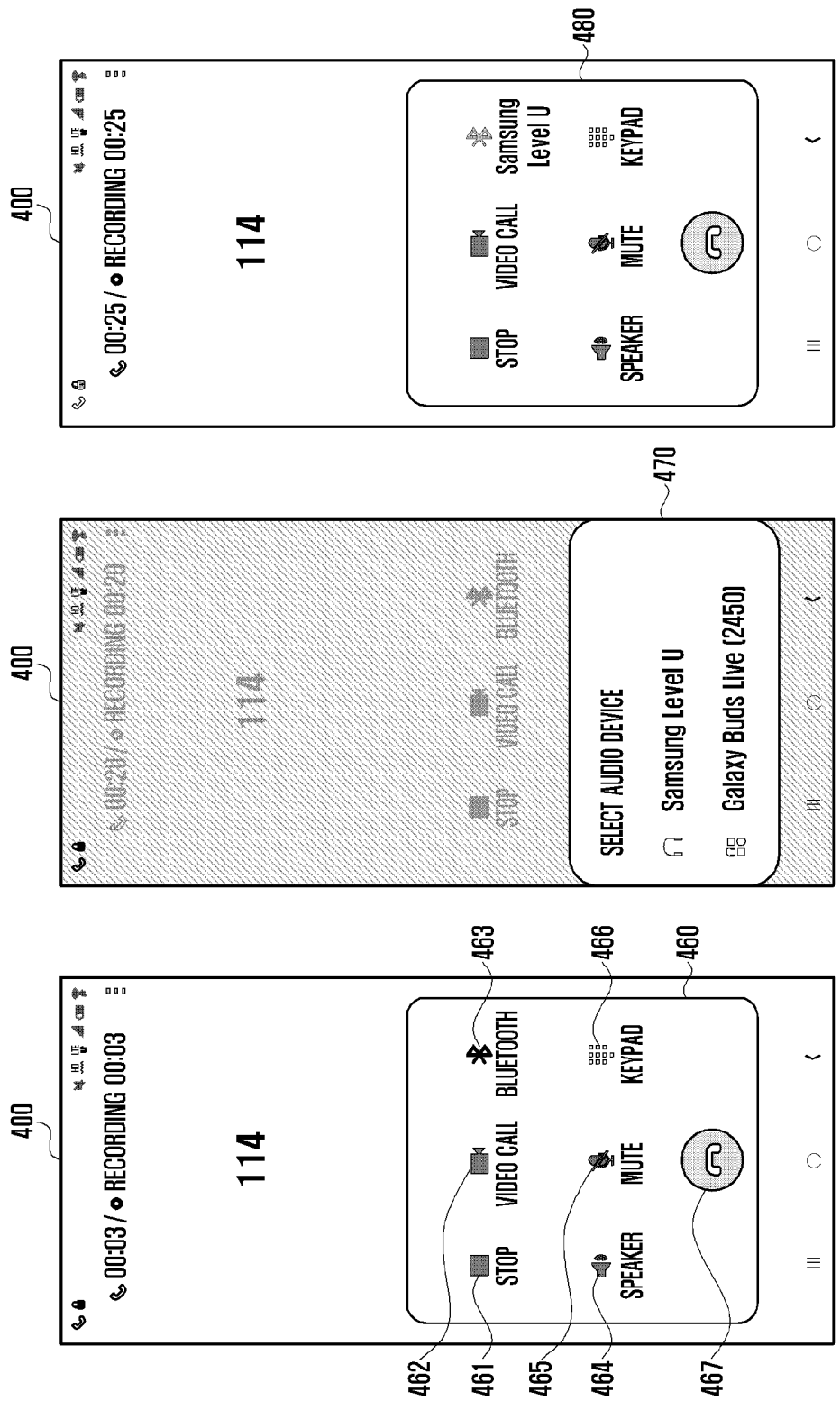
FIG. 4 illustrates a call UI of an electronic device according to an embodiment of the disclosure.

FIG. 4 illustrates a call UI of an electronic device according to an embodiment of the disclosure.

Figure 5:
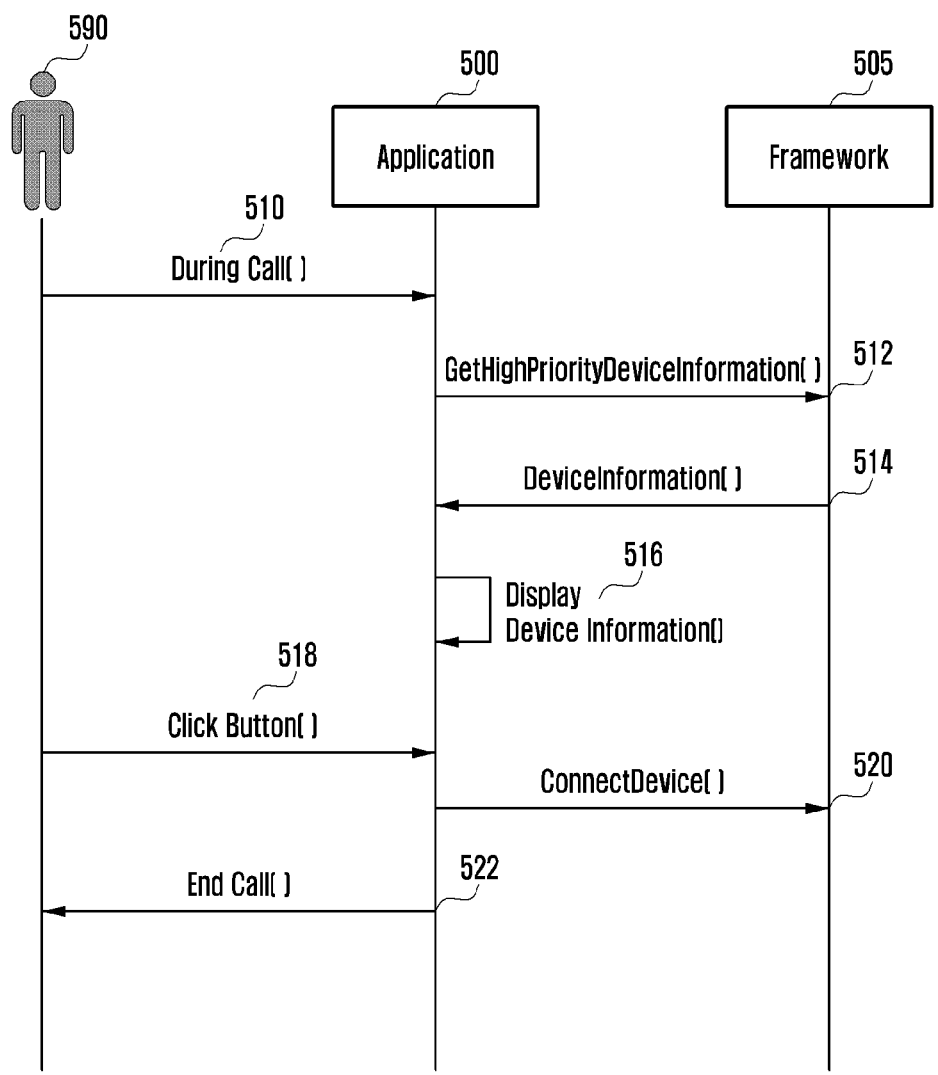
FIG. 5 is a flowchart of a method of determining a priority of an external device by an electronic device according to an embodiment of the disclosure.

FIG. 4 may be a comparative example for a call UI provided in various embodiments of FIG. 5 and the following drawings.

According to various embodiments, an electronic device 400 may execute a call application and display a call UI 460 on a display during a call connection with a counterpart electronic device. Referring to FIG. 4, the call UI 460 may include at least one graphic object allowing selection of a function, such as call recording 461, video call (or voice call) switching 462, Bluetooth button 463, speaker mode 464, transmitted voice mute 465, keypad displaying 466, and call ending 467.

According to an embodiment, the electronic device 400 may display a sub-UI 470 including a list of external devices connectable via Bluetooth to correspond to selection of the Bluetooth button 463 among the at least one graphic object of the call UI 460.

According to an embodiment, in a case where one external device is selected while the sub-UI 470 is displayed, the electronic device 400 may connect to the selected external device and change the Bluetooth button 463 to include information indicating the external device in the call UI 460.

In a case of the embodiment of FIG. 4, the electronic device 400 is able to establish Bluetooth connection with multiple external devices. However, a user may not know which external device is to be connected when the Bluetooth button is selected. For example, in this embodiment, the Bluetooth button 463 of the call UI 460 does not include information on a connectable external device and allows a user to make a selection on the sub-UI 470. Therefore, a user is required to unconditionally make two or more selections (2-depth or higher) for connection with an external device, and the sub-UI 470 displayed in a pop-up type may also be needed. When the two or more selections (2-depth or higher) for connection with an external device has been made, a call UI 480 is redisplayed.

FIG. 5 is a flowchart of a method of determining the priority of an external device by an electronic device according to an embodiment of the disclosure.

A method illustrated in FIG. 5 may be performed by the electronic device 300 in FIG. 3, and an application 500 and a framework 505 may be configured by programs executable by the processor 330 in FIG. 3.

According to various embodiments, the electronic device 300 (e.g., the electronic device 101 in FIG. 1) may include software (e.g., the program 140 in FIG. 1) and hardware (not illustrated). The software may include an application layer, the framework 505, a hardware abstraction layer (not illustrated), and/or a kernel (not illustrated). The application layer may include at least one application 500 executable by the processor 330. The type of the at least one application 500 may be not limited and various such as an Internet browser, a video application, or a game. For example, the application 500 includes a call application 500.

According to various embodiments, the framework 505 (e.g., the middleware 144 in FIG. 1) may provide various functions to the at least one application 500 so that the at least one application 500 uses a function or information provided from one or more resources of the electronic device 300.

According to various embodiments, the call application 500 may, during a call connection, provide a graphic object (e.g., the Bluetooth button 463 in FIG. 3) allowing on/off of connection with an external device connectable via Bluetooth. According to various embodiments, the framework 505 may configure to perform Bluetooth communication with an external device, and include a partial configuration (e.g., a Bluetooth adaptor) of a framework level related to control of a connection with Bluetooth.

According to various embodiments, in operation 510, the electronic device may execute the call application 500, and connect a call (e.g., a voice call or a video call) using a cellular network with a counterpart electronic device.

According to various embodiments, in operation 512, the application 500 may request, from the framework 505, the priority of at least one external device connectable via a designated function during a call.

According to various embodiments, in operation 514, the framework 505 may identify at least one connectable external device, determine the priority of the identified at least one external device, and transfer same to the application 500.

For example, the framework 505 temporarily activates Bluetooth and identify information of an adjacent external device. For example, the information of the external device includes at least one of an ID of the external device, a name, a name input by a user, model information, address information (e.g., media access control (MAC) address), type information of the external device, or operation state information. The operation state information may include information relating to whether the external device is currently activated and is able to communicate with the electronic device via Bluetooth, whether the external device is a device having a profile enabling input/output of a call voice, and/or whether the external device is currently connected to a different device. The framework 505 may identify a connectable external device, based on state information of each external device.

According to various embodiments, the framework 505 may determine the priority of each external device, based on at least one of a connection time point of each external device, a connection frequency, or a configuration of a user 590, and transfer device information and the priority of a connectable external device to the application 500.

According to various embodiments, in operation 516, the application 500 may apply, to a call UI, the device information and the priority of an external device transferred from the framework 505. For example, the application 500 displays a graphic object (e.g., a Bluetooth button) of the call UI to include a first sub-object indicating a function (e.g., Bluetooth connection) assigned to the graphic object and a second sub-object indicating an external device having the highest priority among at least one connectable external device.

According to various embodiments, in operation 518, the application 500 may receive an input of the user 590 for the graphic object of the call UI. For example, the application 500 performs the function (e.g., Bluetooth connection) corresponding to the graphic object in response to an input of the user 590 to the first sub-object of the graphic object. In response to an input of the user 590 to the second sub-object of the graphic object, the application 500 may display a sub-UI allowing selection of one of at least one external device, and in a case where the user 590 selects one of the particular external devices while the sub-UI is displayed, the application may perform the function (e.g., Bluetooth connection) corresponding to the graphic object with the selected external device.

According to various embodiments, in operation 520, the application 500 may request a connection (e.g., Bluetooth connection) with the external device selected via the call UI (or sub-UI) from the framework 505.

According to various embodiments, in operation 522, when the call is terminated, the application 500 may notify the user 590 by terminating the call UI. According to an embodiment, in a case where a call is terminated, the electronic device may maintain, as it is, the function (e.g., Bluetooth connection with the external device) having been executed during the call, and terminate (e.g., Bluetooth disconnection) the corresponding function according to an additional user input.

Figure 6A:
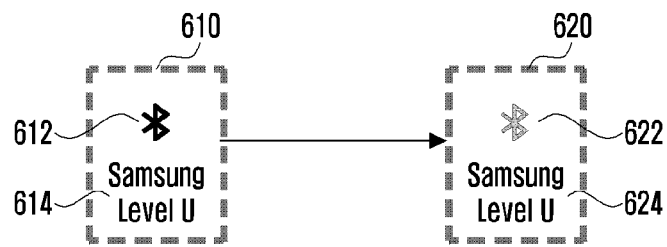
FIGS. 6A and 6B illustrate an operation corresponding to a user input on a call UI according to various embodiments of the disclosure.
Figure 6B:
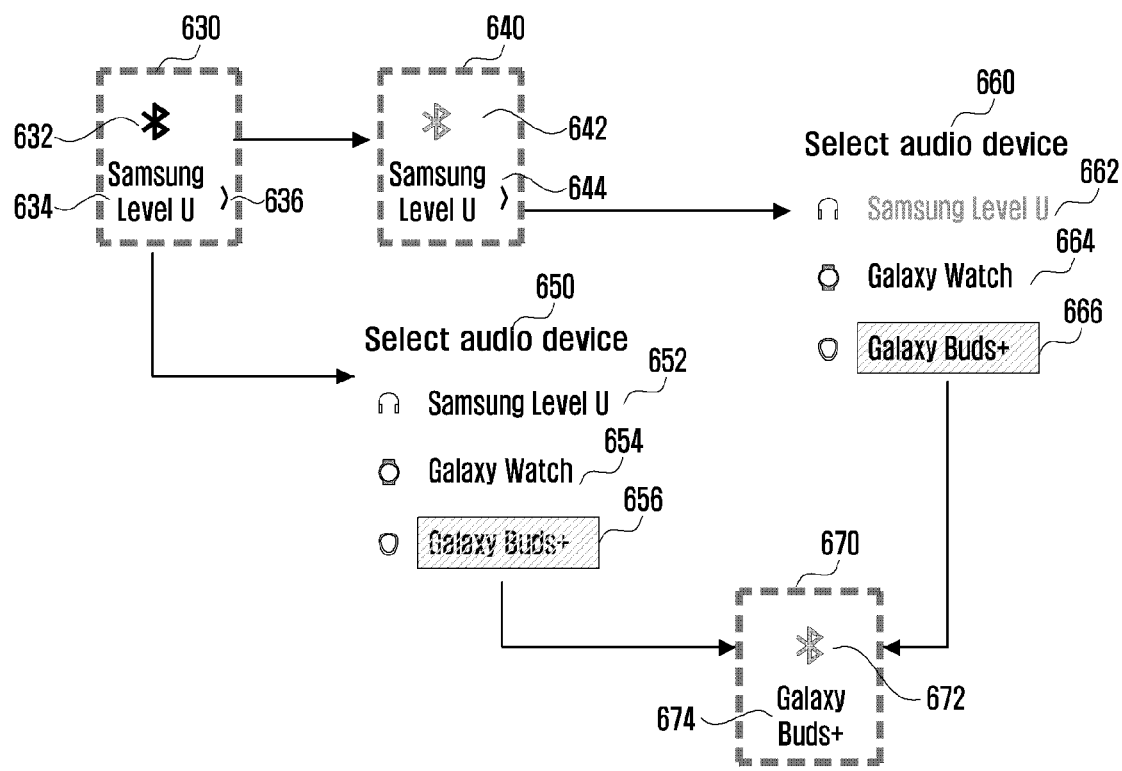

FIGS. 6A and 6B illustrate an operation corresponding to a user input on a call UI according to various embodiments of the disclosure.

FIG. 6A illustrates a graphic object displayed in a case where there is one external device connectable with an electronic device (e.g., the electronic device 300 in FIG. 3) via Bluetooth.

Referring to FIG. 6A, a graphic object 610 may include a first sub-object 612 indicating a function of the graphic object 610, and a second sub-object 614 indicating an external device connectable via the corresponding function. Referring to FIG. 6A, the first sub-object 612 may include an image defined in a Bluetooth standard and/or widely used in Bluetooth technology. The second sub-object 614 is text information indicating an external device, and for example, includes at least one of a name or ID provided from the corresponding device, or a name input by a user. In a state where a Bluetooth connection has not been initiated yet, the first sub-object 612 and/or the second sub-object 614 are displayed in black and white, and in a state where a Bluetooth connection is established, the same objects may be visually differently displayed.

According to various embodiments, the electronic device 300 may execute the function corresponding to the graphic object, based on a user input to the first sub-object or the second sub-object.

In an embodiment of FIG. 6A, in a case where a user selects the first sub-object or the second sub-object, a Bluetooth connection with a connectable external device (e.g., Samsung level U) may be performed. In a case where a connection is proceeded (or completed), the electronic device 300 may display a first sub-object 622 and/or a second sub-object 624 in a designated color so that a graphic object 620 is visually distinguished from a state before the connection.

FIG. 6B illustrates a graphic object displayed in a case where there are two or more external devices connectable with an electronic device (e.g., the electronic device 300 in FIG. 3) via Bluetooth.

According to various embodiments, a graphic object 630 may include a first sub-object 632 indicating a function of the graphic object 630, and a second sub-object 634 indicating an external device having the highest priority among multiple external devices connectable via the corresponding function. For example, a framework (e.g., the framework 505 in FIG. 5) of the electronic device identifies external devices connectable via Bluetooth, and determine the priorities of the external devices, based on at least one of a connection time point of each external device, a connection frequency, or a user's configuration.

Referring to FIG. 6B, the graphic object 630 displayed before Bluetooth connection may include the first sub-object 632 and the second sub-object 634. In this embodiment, there are multiple connectable external devices. Therefore, the second sub-object 634 may include an object 636 for indicating connectability with a different external device, and thus be distinguished from the second sub-object 624 in FIG. 6A indicating that there is one connectable external device.

According to various embodiments, the electronic device may perform Bluetooth connection with an external device indicated by the second sub-object 634, that is, an external device (Samsung level U) having the highest priority in response to a user input to the first sub-object 632. In a case where a user input to a second sub-object 644 is generated during a connection process with the corresponding external device or after the connection therewith, the electronic device may display a sub-UI 660 including information indicating connectable external devices (Galaxy Watch 654 or 664 and Galaxy Buds) and including the corresponding external device (Samsung level U(640 or 642)). For example, the sub-UI 660 is displayed on the call UI in a pop-up type. For example, the information indicating connectable external devices (Galaxy Watch and Galaxy Buds) and including the corresponding external device (Samsung level U) are displayed on the sub-UI 660 in a type of a list. In a case where one device (Galaxy Buds+) 666 is selected by a user in the list of the sub-UI 660, the electronic device may connect to the corresponding external device.

According to various embodiments, the electronic device may display a sub-UI 650 allowing selection of one of external devices in response to a user input to the second sub-object 634. In a case where a user selects one of designated external devices while the sub-UI 650 is displayed, a Bluetooth connection may be performed with a selected external device (Galaxy buds+) 656. In a case where a designated external device is selected on the sub-UI 650, the electronic device may remove the sub-UI 650, and change a second sub-object 674 of a corresponding graphic object 670 of the call UI to information indicating the external device selected by a user on the sub-UI 650.

According to various embodiments, in a case where a different external device (e.g., the Galaxy buds+ 656 or 666) is selected rather than an external device (e.g., the Samsung level U 652 or 662) having the highest priority on the sub-UI 650 or 660, the second sub-object 672 or 674 in the graphic object 670 may be changed to information indicating the corresponding external device.

Figure 7:
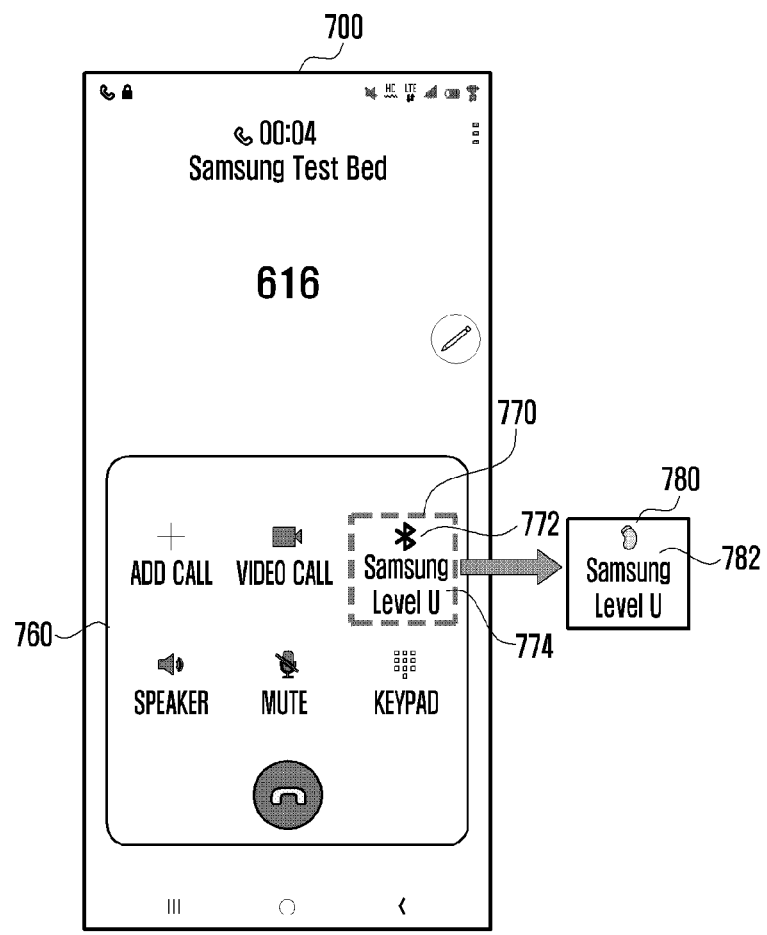
FIG. 7 illustrates a call UI according to an embodiment of the disclosure.

FIG. 7 illustrates a call UI according to an embodiment of the disclosure.

According to various embodiments, an electronic device 700 (e.g., the electronic device 300 in FIG. 3) may change a first sub-object to a third sub-object indicating the type of a connected external device when connecting to the external device according to a user's selection on a call UI 760.

Referring to FIG. 7, before a connection to an external device, a Bluetooth button 770 of the call UI 760 may display a first sub-object 772 indicating Bluetooth and a second sub-object 774 indicating an external device (Samsung level U) having the highest priority.

According to an embodiment, in a case where a Bluetooth connection with an external device is completed according to a user's selection, the electronic device 700 may change the first sub-object 772 to a third sub-object 782 indicating the type (e.g., earbuds 780) of the external device and display same. For example, the electronic device 700 changes the first sub-object 772 to the third sub-object 782 and display same, based on image information (e.g., an icon) indicating type information of the external device from information of the external device transferred from a framework (e.g., the framework 505 in FIG. 5).

Figure 8:
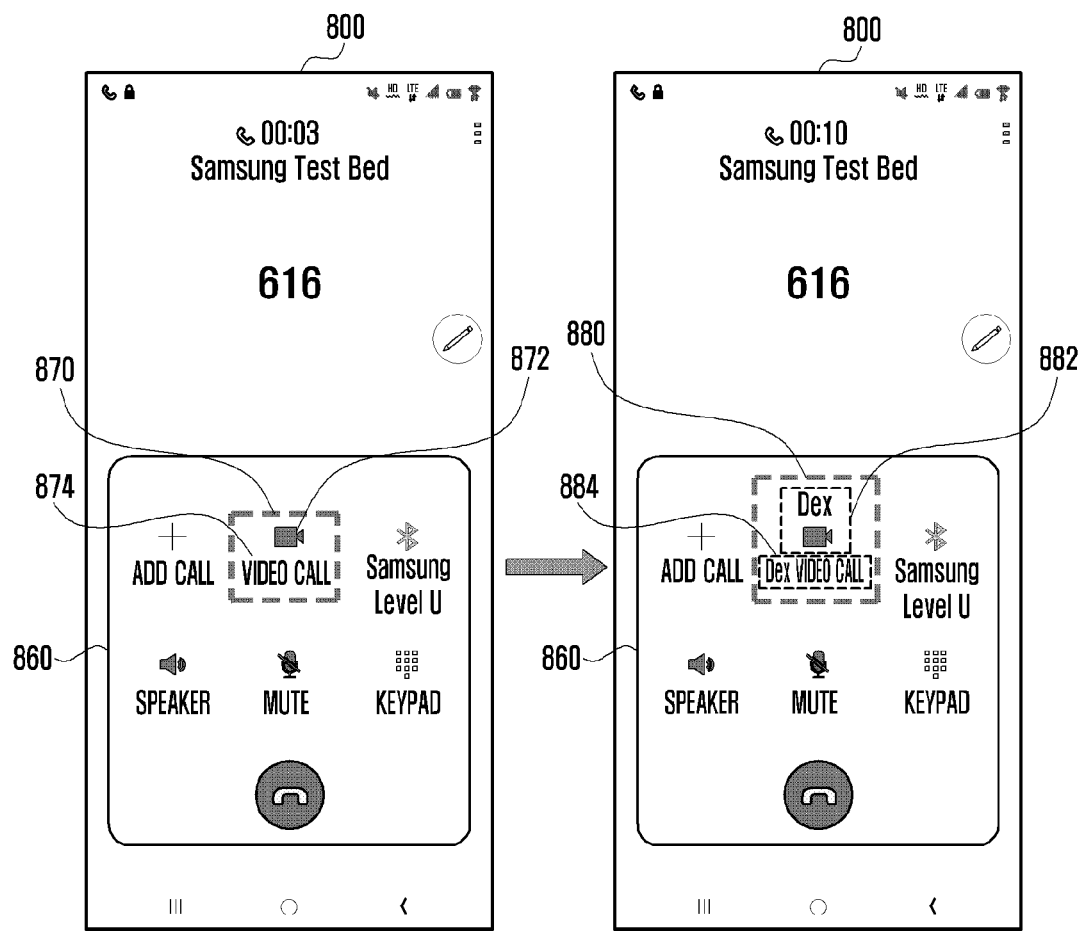
FIG. 8 illustrates a call UI according to an embodiment of the disclosure.

FIG. 8 illustrates a call UI according to an embodiment of the disclosure.

FIG. 8 shows a call UI 860 provided in a case where an electronic device 800 (e.g., the electronic device 300 in FIG. 3) is connected to an external device through short-range communication such as desktop experience (Dex), and is able to use a camera resource of the external device.

According to various embodiments, the electronic device 800 may be connected to an external device (e.g., a laptop PC, a tablet PC, or a smart television (TV)) including a camera, and use a camera resource of the external device. The electronic device 800 may identify, in the call UI 860, a video call switching function that is a function allowing use of the camera resource of the external device, and change a graphic object to correspond to a connection with an external device.

According to various embodiments, a graphic object 870 may include a first sub-object 872 and a second sub-object 874 indicating a function of the graphic object 870. Referring to FIG. 8, the first sub-object 872 may include an image defined in a video call standard and/or widely used in video call technology. The second sub-object 874 may include text information indicating a video call function.

Referring to FIG. 8, the electronic device 800 may generate and display, in a video call switching button 880, a first sub-object 882 indicating a corresponding function and a second sub-object 884 indicating an external device or indicating a function (e.g., a Dex mode) of using a camera resource. In a case where a user selects the video call switching button 880, the electronic device 800 may switch a voice call being performed to a video call, receive, in real time, an image obtained by a camera of a corresponding external device, and then transmit the image to a counterpart electronic device.

According to various embodiments, in a case where there are multiple devices capable of providing a camera resource in relation to a video call function, the second sub-object 884 may include information indicating an external device having the highest priority. In this case, in the same method as that described with reference to FIG. 6B, in a case where a user selects the first sub-object 882, a camera image may be received from an external device indicated by the second sub-object 884, and in a case where a user selects the second sub-object 884, a sub-UI (e.g., the sub-UI 650 or 660 in FIG. 6B) allowing selection of one among multiple external devices may be displayed.

An electronic device according to various embodiments may include a display, a communication module, and a processor operatively connected to the display and the communication module, wherein the processor is configured to, in case that a call is connected to a counterpart electronic device, display a call UI including multiple graphic objects allowing selection of a function available during a call, identify at least one external device connectable via the communication module in relation to a function of a first graphic object of the call UI, determine a priority of the identified at least one external device, and display the first graphic object including a first sub-object indicating the function of the first graphic object and a second sub-object indicating a first external device having a highest priority among the identified at least one external device.

According to various embodiments, the processor may be configured to, in case that the first sub-object is selected according to a user input on the call UI, connect to the first external device indicated by the first sub-object by using the communication module.

According to various embodiments, the processor may be configured to, in case that the second sub-object is selected according to a user input on the call UI, display a sub-UI allowing selection of one of the at least one connectable external device, and connect to an external device selected according to a user input on the sub-UI, via the communication module.

According to various embodiments, the processor may be configured to display the sub-UI on the call UI in a pop-up type.

According to various embodiments, the function assigned to the first graphic object may correspond to connecting with an external device via Bluetooth.

According to various embodiments, the processor may be configured to, in case that the number of the connectable external devices is one, connect to the external device by using the communication module according to a user input to the first sub-object or the second sub-object.

According to various embodiments, the processor may be configured to determine the priority, based on at least one of a connection time point of the at least one connectable external device, a connection frequency, or a user's configuration.

According to various embodiments, the processor may be configured to broadcast a signal for identifying an operation state of an adjacent external device via the communication module, and identify the at least one connectable external device, based on operation state information received from the external device.

According to various embodiments, the processor may be configured to, in case that a connection with the first external device is performed according to a user input on the graphic object, change the first sub-object to a third sub-object indicating a type of the first external device.

According to various embodiments, the processor may be configured to, in case that the function of the first graphic object is activated, identify a second graphic object to which a function changeable in conjunction with the function of the first graphic object is assigned, and change the second graphic object.

According to various embodiments, the processor may be configured to, in case that the first external device is connected to a different electronic device, display information indicating the connection to the different electronic device on the first graphic object.

Figure 9:
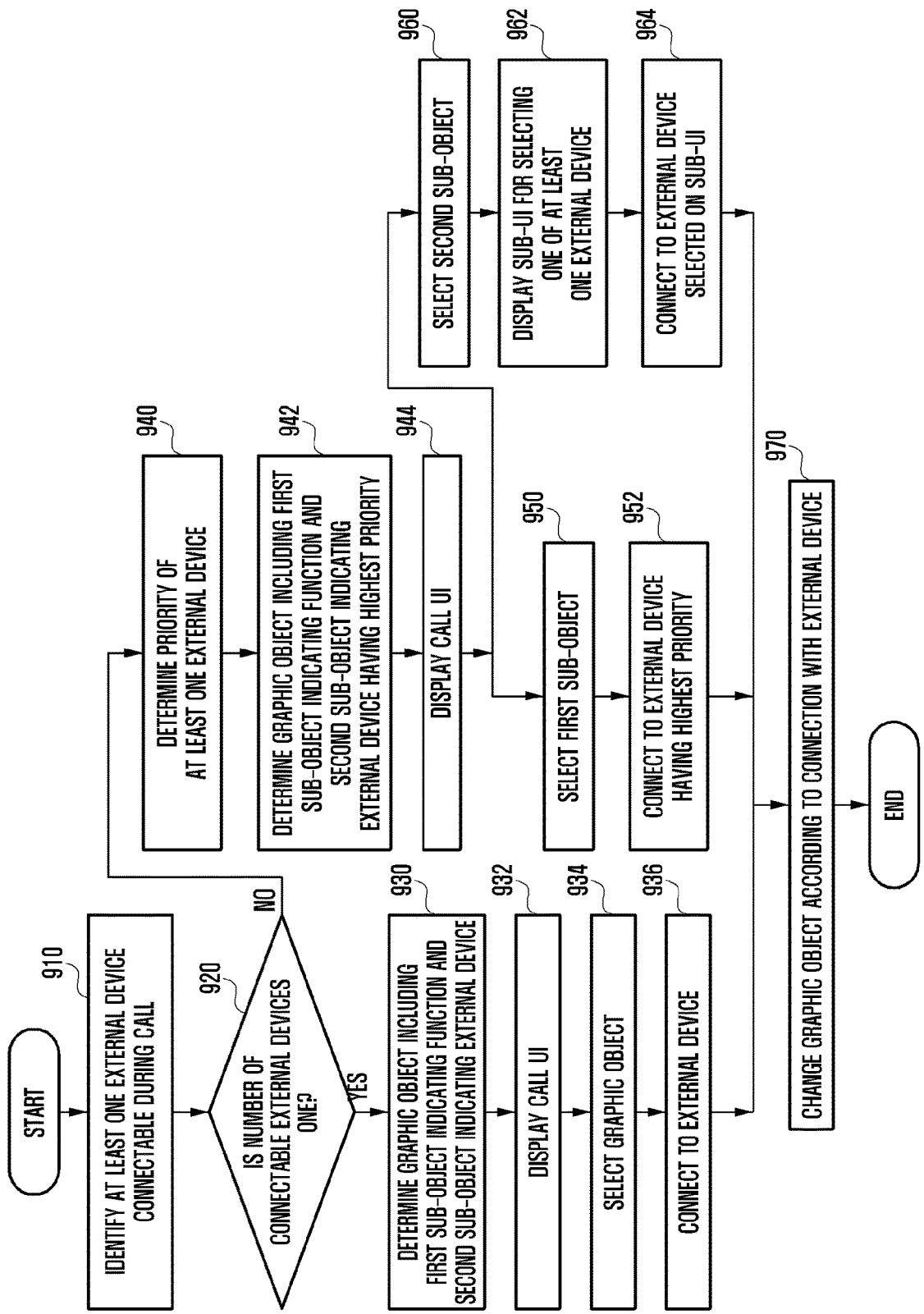
FIG. 9 is a flowchart of a user interface providing method of an electronic device according to an embodiment of the disclosure.

FIG. 9 is a flowchart of a user interface providing method of an electronic device according to an embodiment of the disclosure.

The method illustrated in FIG. 9 may be performed by an electronic device (e.g., the electronic device 300 in FIG. 3) described with reference to FIGS. 2 to 5, 6A, 6B, 7 and 8, and in the following description, a description of technical features described above will be omitted.

Referring to FIG. 9, according to various embodiments, in operation 910, an electronic device may identify at least one external device connectable via a designated function during a call. For example, the electronic device identifies an external device connectable via Bluetooth, and determines a connectable external device by identifying whether a profile of the external device is a profile (e.g., a hands-free profile (HFP) or a headset profile (HSP)) available for a call, and/or whether the external device is currently connected to a different device.

According to various embodiments, in operation 920, the electronic device may identify whether the number of the identified connectable external devices is one, or two or greater.

According to various embodiments, in a case where the number of the connectable external devices is one in operation 920—YES, in operation 930, the electronic device may generate a graphic object including a first sub-object indicating a function (e.g., Bluetooth connection) assigned to the graphic object and a second sub-object indicating the external device. For example, the first sub-object includes an image indicating Bluetooth, and the second sub-object may include at least one of a name or an ID of the identified external device, and a name input by a user.

According to various embodiments, in operation 932, the electronic device may generate a call UI including the generated graphic object and display same on a display (e.g., the display 310 in FIG. 3).

According to various embodiments, in operation 934, the electronic device may receive a user input to the first sub-object or the second sub-object of the graphic object.

According to various embodiments, in operation 936, the electronic device may connect to the external device in response to the user input.

According to various embodiments, in a case where the number of the connectable external devices is two or greater in operation 920-NO, in operation 940, the electronic device may determine the priorities of the identified multiple external devices. Here, the priority may be determined based on a connection time point of each external device, a connection frequency, and/or a user's configuration. For example, the electronic device at least one of determines a priority in an order of recent connection (e.g., paring or bonding), or determines a priority in an order from the largest connection counts to the smallest during a predetermined period (e.g., one week or one month), and may determine a first ranking for an external device designated by a user's selection on a UI. According to an embodiment, a call application executed during a call may request the priority of at least one external device from a framework (e.g., a Bluetooth adaptor), and the framework may provide information of an external device having the highest priority to the call application.

According to various embodiments, in operation 942, the electronic device may generate a graphic object including a first sub-object indicating a function assigned to the graphic object and a second sub-object indicating an external device having the highest priority.

According to various embodiments, in operation 944, the electronic device may generate a call UI including the generated graphic object and display same on the display.

According to various embodiments, in operation 950, the electronic device may receive a user input of selecting the first sub-object while the call UI is displayed.

According to various embodiments, in operation 952, the electronic device may perform Bluetooth connection with the external device having the highest priority in response to the selection of the first sub-object.

According to various embodiments, in operation 960, the electronic device may receive a user input of selecting the second sub-object while the call UI is displayed.

According to various embodiments, in operation 962, the electronic device may display a sub-UI for selecting one of external devices. The sub-UI may include a list of an external device having the highest priority and other connectable external devices.

According to various embodiments, in operation 964, the electronic device may connect to an external device selected according to the user input on the sub-UI.

According to various embodiments, in operation 970, the electronic device may change at least a part of the graphic object in a case where a connection with an external device is performed. For example, the electronic device may display, in black and white, an image (or icon) of the first sub-object of a Bluetooth button before Bluetooth connection with an external device, and display same in a designated color when connection is proceeded (or completed), so as to be visually distinguished. Alternatively, the electronic device may change the first sub-object to a third sub-object indicating a type of an external device for which a connection is proceeded (or completed).

Figure 10A:
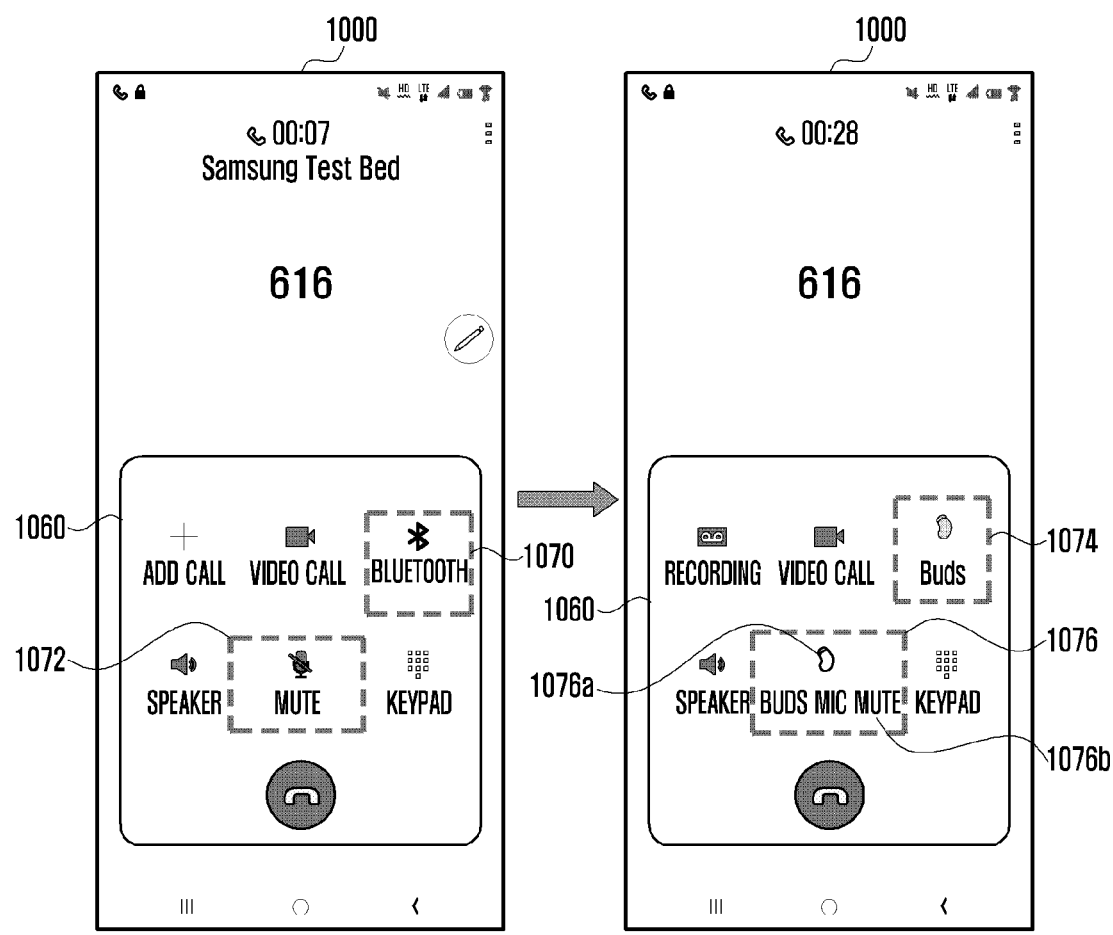
FIGS. 10A and 10B illustrate a call UI according to various embodiments of the disclosure.
Figure 10B:
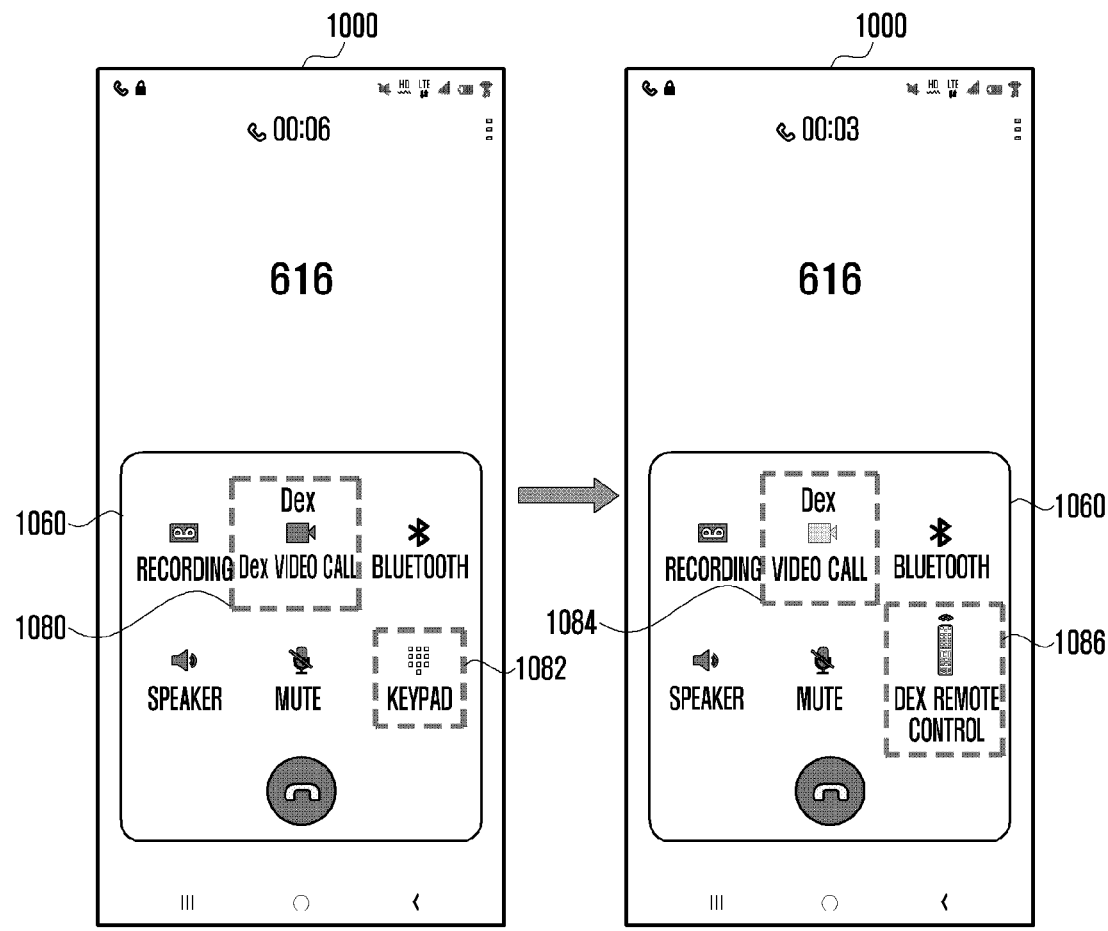

FIGS. 10A and 10B illustrate a call UI according to various embodiments of the disclosure.

According to various embodiments, an electronic device 1000 (e.g., the electronic device 300 in FIG. 3) may also change a second graphic object according to activation of a function of a first graphic object among multiple graphic objects of a call UI 1060. A function assigned to the second graphic object may be a function changed in conjunction with activation of a function of the first graphic object.

Referring to FIG. 10A, in a case where, during a call, an external device (e.g., earbuds) is connected through Bluetooth and call voice input/output is used, the electronic device 1000 may identify a transmitted voice mute button 1072 as a graphic object corresponding to a call voice input/output function. In a case where a Bluetooth connection with an external device is performed, the electronic device 1000 may change a Bluetooth button 1070 on the call UI 1060, and change the transmitted voice mute button 1072 corresponding to same. Referring to FIG. 10A, the electronic device 1000 may change a first sub-object of a transmitted voice mute button 1076 to an image 1076a indicating an external device (e.g., earbuds 1074), and change a second sub-object to information 1076b indicating blockage of a voice transmitted from the external device.

Referring to FIG. 10B, the electronic device 1000 may support switching to a video call by using a camera of an external device (e.g., a laptop PC or a tablet PC) during a voice call while being connected to the external device in a Dex mode. The electronic device 1000 may include information indicating the Dex mode in a video call switching button 1080. In a case where a camera image of the external device is received after switching to a video call, a Dex remote control of the external device may also be used.

In a case of switching to a video call according to selection of the video call switching button 1080, the electronic device 1000 may change to a video call switching button 1084 and change a keypad button 1082 to information 1086 indicating the Dex remote control.

FIGS. 10A and 10B merely correspond to an embodiment, and the electronic device 1000 may identify, based on received device information of an external device, a different function changeable in conjunction with execution of one of functions assigned to the graphic objects of the call UI 1060, and change a graphic object of the corresponding function.

Table 1 shows an example of changing a graphic object according to a connected device.

TABLE 1

| | Keypad button | Speaker | Mute | Bluetooth |
|---|---|---|---|---|
| Dex device | Controller | External speaker | External microphone | Connected device information |
| AI speaker | Controller | External speaker | External microphone | Connected device information |
| Bluetooth audio earphones | — | — | Bluetooth audio microphone | Connected device information |
| Bluetooth keyboard | Keyboard controller | — | — | — |
| Wired earphones | — | — | Earphone microphone | — |

Figure 11:
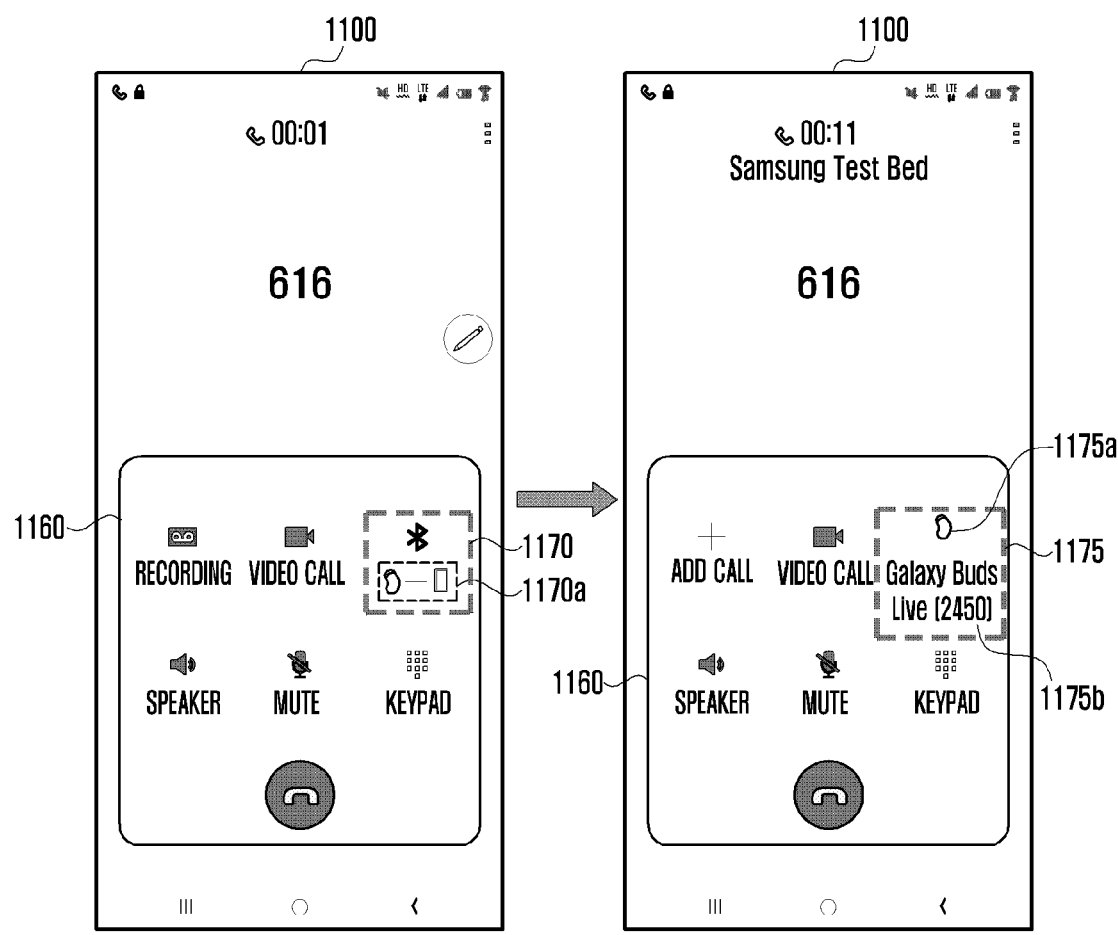
FIG. 11 illustrates a call UI according to an embodiment of the disclosure.

FIG. 11 illustrates a call UI according to an embodiment of the disclosure. According to various embodiments, an electronic device 1100 (e.g., the electronic device 300 in FIG. 3) may connect to an external device already connected to a different device.

Referring to FIG. 11, in a case where earbuds are already connected to a different device, the electronic device 1100 may display information 1170a indicating that the corresponding earbuds are already connected to a different device, in a Bluetooth button 1170 of a call UI 1160. The electronic device 1100 may perform a Bluetooth connection to the earbuds in a case where a user selects the Bluetooth button 1170. In this case, the earbuds may release previously established Bluetooth connection with the different device, and attempt to establish Bluetooth connection with the electronic device 1100. A graphic object 1175 may be changed to include a first sub-object 1175a indicating connection to earbuds and a second sub-object indicating information 1175b indicating the connected earbuds according to a Bluetooth connection with the earbuds.

Accordingly, a user may change an audio path from the different device to the electronic device 1100 while wearing the earbuds.

A user interface providing method of an electronic device according to various embodiments may include, in case that a call is connected to a counterpart electronic device, identifying at least one external device connectable to the electronic device in relation to a function of a first graphic object of a call UI, determining a priority of the identified at least one external device, and displaying the call UI including multiple graphic objects allowing selection of a function available during a call, wherein the first graphic object of the call UI includes a first sub-object indicating the function of the first graphic object and a second sub-object indicating a first external device having a highest priority among the identified at least one external device.

According to various embodiments, the method may further include, in case that the first sub-object is selected according to a user input on the call UI, connecting to the first external device indicated by the first sub-object.

According to various embodiments, the method may include displaying a sub-UI allowing selection of one of the at least one connectable external device in case that the second sub-object is selected according to a user input on the call UI, and connecting to an external device selected according to a user input on the sub-UI.

According to various embodiments, the displaying of the sub-UI may include displaying the sub-UI on the call UI in a pop-up type.

According to various embodiments, the function assigned to the first graphic object may correspond to connecting with an external device via Bluetooth.

According to various embodiments, the method may further include connecting to the external device according to a user input to the first sub-object or the second sub-object in case that the number of the connectable external devices is one.

According to various embodiments, the determining of the priority may include determining the priority, based on at least one of a connection time point of the at least one connectable external device, a connection frequency, or a user's configuration.

According to various embodiments, the method may further include changing the first sub-object to a third sub-object indicating a type of the first external device in case that a connection with the first external device is performed according to a user input on the graphic object.

According to various embodiments, the method may further include identifying a second graphic object to which a function changeable in conjunction with the function of the first graphic object is assigned, in case that the function of the first graphic object is activated, and changing the second graphic object.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a display;
    a communication interface;
    memory storing instructions; and
    one or more processors communicatively coupled to the display, the communication interface, and the memory,
    wherein the instructions, when executed by the one or more processors individually or collectively, cause the electronic device to:
        during a call in which the electronic device is connected to a counterpart electronic device via the communication interface, display a call user interface (UI) including multiple graphic objects allowing selection of multiple functions, respectively, available during the call,
        during the call, identify connectable external devices that are connectable via the communication interface in relation to a function of a first graphic object among the multiple graphic objects of the call UI,
        determine priorities of the connectable external devices, respectively, based on one or more of a connection time point of each connectable external device, a connection frequency, and a user's configuration, and
        display the first graphic object,
    wherein the first graphic object comprises:
        a first sub-object including an image corresponding to a communication-type technology indicating the function of the first graphic object, and
        a second sub-object including text information indicating a first external device having a highest priority among the connectable external devices, and
    wherein the first sub-object and the second sub-object are continuously and simultaneously displayed next to each other.

2. The electronic device of claim 1, wherein the instructions, when executed by the one or more processors individually or collectively, further cause the electronic device to:

in case that the first sub-object is selected according to a user input on the call UI, connect to the first external device indicated by the first sub-object by using the communication interface.

3. The electronic device of claim 1, wherein the instructions, when executed by the one or more processors individually or collectively, further cause the electronic device to:
in case that the second sub-object is selected according to a user input on the call UI, display a sub-UI allowing selection of one of the connectable external devices, and
connect to an external device selected according to a user input on the sub-UI, via the communication interface.

4. The electronic device of claim 3, wherein the instructions, when executed by the one or more processors individually or collectively, further cause the electronic device to:
display the sub-UI on the call UI in a pop-up type.

5. The electronic device of claim 1, wherein the function of the first graphic object includes connecting with an external device via Bluetooth communication.

6. The electronic device of claim 1, wherein the instructions, when executed by the one or more processors individually or collectively, further cause the electronic device to:
in case that there is only one connectable external device among the connectable external devices in that a number of the connectable external devices is one, connect to the one connectable external device by using the communication interface according to a user input to the first sub-object or the second sub-object.

7. The electronic device of claim 1, wherein the instructions, when executed by the one or more processors individually or collectively, further cause the electronic device to:
broadcast a signal for identifying an operation state of at least one adjacent external device via the communication interface, and
identify the connectable external devices based on operation state information received from the at least one adjacent external device.

8. The electronic device of claim 1, wherein the instructions, when executed by the one or more processors individually or collectively, further cause the electronic device to:
in case that a connection with the first external device is performed according to a user input on the first graphic object, change the first sub-object to a third sub-object indicating a type of the first external device.

9. The electronic device of claim 1, wherein the instructions, when executed by the one or more processors individually or collectively, further cause the electronic device to:
in case that the function of the first graphic object is activated, identify a second graphic object to which a function changeable in conjunction with the function of the first graphic object is assigned, and
change the second graphic object.

10. The electronic device of claim 1, wherein the instructions, when executed by the one or more processors individually or collectively, further cause the electronic device to:
in case that the first external device is connected to a different electronic device, display information indicating a connection to the different electronic device on the first graphic object.

11. The electronic device of claim 1, wherein the instructions, when executed by the one or more processors individually or collectively, further cause the electronic device to:
in case the first sub-object including a Bluetooth image of a Bluetooth button is selected, perform Bluetooth connection with the first external device indicated by the second sub-object by using the communication interface.

12. A method performed by an electronic device for providing a user interface, the method comprising:
during a call in which the electronic device is connected to a counterpart electronic device via a communication interface, display a call user interface (UI) including multiple graphic objects allowing selection of multiple functions, respectively, available during the call;
during the call, identifying, by the electronic device, connectable external devices that are connectable via the communication interface in relation to a function of a first graphic object among the multiple graphic objects of the call UI;
determining, by the electronic device, priorities of the connectable external devices, respectively, based on one or more of a connection time point of each connectable external device, a connection frequency, and a user's configuration; and
displaying, by the electronic device, the first graphic object,
wherein the first graphic object of the call UI comprises:
a first sub-object including an image corresponding to a communication-type technology indicating the function of the first graphic object, and
a second sub-object including text information indicating a first external device having a highest priority among the connectable external devices, and
wherein the first sub-object and the second sub-object are continuously and simultaneously displayed next to each other.

13. The method of claim 12, further comprising:
based on the first sub-object being selected according to a user input on the call UI, connecting, by the electronic device, to the first external device indicated by the first sub-object.

14. The method of claim 12, further comprising:
based on the second sub-object being selected according to a user input on the call UI, displaying, by the electronic device, a sub-UI allowing selection of one of the connectable external devices; and
connecting, by the electronic device, to an external device selected according to a user input on the sub-UI.

15. The method of claim 14, wherein the displaying of the sub-UI comprises displaying the sub-UI on the call UI in a pop-up type.

16. The method of claim 12, wherein the function assigned to of the first graphic object includes connecting with an external device via Bluetooth communication.

17. The method of claim 12, further comprising:
based on there being only one connectable external device among the connectable external devices in that a number of the connectable external devices is one, connecting, by the electronic device, to the one connectable external device according to a user input to the first sub-object or the second sub-object.

18. The method of claim 12, further comprising:
based on a connection with the first external device being performed according to a user input on the first graphic object, changing, by the electronic device, the first sub-object to a third sub-object indicating a type of the first external device.

19. The method of claim 12, further comprising:

based on the function of the first graphic object being activated, identifying, by the electronic device, a second graphic object to which a function changeable in conjunction with the function of the first graphic object is assigned; and changing, by the electronic device, the second graphic object.

* * * * *